(12) United States Patent
Reddy et al.

(10) Patent No.: US 7,493,968 B2
(45) Date of Patent: Feb. 24, 2009

(54) COMPOSITIONS COMPRISING MELT-PROCESSED INORGANIC FIBERS AND METHODS OF USING SUCH COMPOSITIONS

(75) Inventors: B. Raghava Reddy, Duncan, OK (US); Krishna M. Ravi, Kingwood, TX (US); Bryan K. Waugh, Comanche, OK (US)

(73) Assignee: Halliburton Energy Services, Inc.

( * ) Notice: Subject to any disclaimer, the term of this patent is extended or adjusted under 35 U.S.C. 154(b) by 0 days.

(21) Appl. No.: 11/940,173

(22) Filed: Nov. 14, 2007

(65) Prior Publication Data

US 2008/0103065 A1 May 1, 2008

Related U.S. Application Data (63) Continuation of application No. 11/272,951, filed on Nov. 14, 2005, now abandoned, which is a continuation-in-part of application No. 11/101,762, filed on Apr. 8, 2005, which is a continuation-in-part of application No. 10/884,756, filed on Jul. 2, 2004, now Pat. No. 7,178,597.

(51) Int. Cl.
*E21B 21/00* (2006.01)
*C09K 8/16* (2006.01)

(52) U.S. Cl. .......................... 175/72; 175/65; 507/140; 507/906

(58) Field of Classification Search .................. None
See application file for complete search history.

(56) References Cited

U.S. PATENT DOCUMENTS

| | | | | |
|---|---|---|---|---|
| 2,463,561 A | 3/1949 | Riley | | 106/99 |
| 2,738,285 A | 3/1956 | Biefeld et al. | | 106/99 |
| 2,779,417 A | 1/1957 | Clark et al. | | 166/61 |
| 2,805,719 A | 9/1957 | Anderson | | 166/29 |
| 3,036,633 A | 5/1962 | Mayhew | | 166/31 |
| 3,092,505 A | 6/1963 | Demaison | | 106/99 |
| 3,146,828 A | 9/1964 | Mann | | 166/12 |
| 3,220,863 A | 11/1965 | Mayhew | | 106/96 |
| 3,363,689 A | 1/1968 | Smith et al. | | 166/29 |
| 3,736,162 A | 5/1973 | Chvalovsky et al. | | 106/99 |
| 3,774,683 A | 11/1973 | Smith et al. | | 166/293 |
| 3,834,916 A | 9/1974 | Kesler | | 106/99 |
| 3,844,351 A | 10/1974 | Sutton et al. | | 166/293 |
| 3,852,082 A | 12/1974 | Majumdar et al. | | 106/709 |
| 3,854,986 A | 12/1974 | Chvalovsky et al. | | 428/391 |
| 3,861,926 A | 1/1975 | Irlam et al. | | 501/38 |
| 3,861,927 A | 1/1975 | Kimura et al. | | 501/38 |
| 3,904,424 A | 9/1975 | Aoki et al. | | 501/38 |
| 3,953,953 A | 5/1976 | Marsden | | 428/603 |
| 4,008,094 A | 2/1977 | Beall et al. | | 252/62.59 |
| 4,030,939 A | 6/1977 | Mallow | | 106/624 |
| 4,036,654 A | 7/1977 | Yale et al. | | 501/38 |
| 4,062,913 A | 12/1977 | Miller et al. | | 264/437 |
| 4,066,465 A | 1/1978 | Mohri et al. | | 501/38 |
| 4,090,884 A | 5/1978 | Goeman | | 106/711 |
| 4,140,533 A | 2/1979 | Ohtomo et al. | | 501/38 |
| 4,142,906 A | 3/1979 | Iizawa | | 501/38 |
| 4,199,336 A | 4/1980 | Rittler | | 65/376 |
| 4,224,377 A | 9/1980 | Moens | | 428/369 |
| 4,240,840 A | 12/1980 | Downing et al. | | 106/696 |
| 4,289,536 A | 9/1981 | Dereser | | 523/217 |
| 4,304,604 A | 12/1981 | Daerr et al. | | 501/38 |
| 4,341,835 A | 7/1982 | MacDowell | | 428/294.7 |
| 4,345,037 A | 8/1982 | Fyles et al. | | 501/38 |
| 4,366,255 A | 12/1982 | Lankard | | 501/95.1 |
| 4,474,907 A | 10/1984 | Genba et al. | | 523/206 |
| 4,534,796 A | 8/1985 | Massol et al. | | 106/711 |
| 4,565,840 A | 1/1986 | Kobayashi et al. | | 524/8 |
| 4,585,487 A | 4/1986 | Destree et al. | | 106/644 |
| 4,610,926 A | 9/1986 | Tezuka | | 428/399 |
| 4,689,084 A | 8/1987 | Ambroise et al. | | 106/711 |
| 4,780,141 A | 10/1988 | Double et al. | | 106/38.3 |
| 4,793,861 A | 12/1988 | Sohm | | 524/5 |
| 4,818,288 A | 4/1989 | Aignesberger et al. | | 106/790 |
| 4,835,122 A | 5/1989 | Chopinet et al. | | 501/35 |
| 4,836,940 A | 6/1989 | Alexander | | 507/119 |

(Continued)

FOREIGN PATENT DOCUMENTS

EP 1284248 A1 2/2003

(Continued)

OTHER PUBLICATIONS

Notice of Allowance from U.S. Appl. No. 10/884,756, Dec. 19, 2006.

(Continued)

*Primary Examiner*—George Suchfield
(74) *Attorney, Agent, or Firm*—Craig W. Roddy; Baker Botts, LLP (57) ABSTRACT

Improved lost circulation compositions that include melt-processed inorganic fibers and methods for using such compositions in subterranean formations are provided. An example of a method of the present invention is a method comprising providing a drilling mud comprising a plurality of melt-processed inorganic fibers, wherein the melt-processed inorganic fibers have a length of less than about 10 millimeters, and comprise at least one melt-processed inorganic fiber selected from the group consisting of: a basalt fiber, a wollastonite fiber, and a ceramic fiber; and circulating the drilling mud in the subterranean formation.

20 Claims, 2 Drawing Sheets

U.S. PATENT DOCUMENTS

| | | | |
|---|---|---|---|
| 4,858,487 A | 8/1989 | Mercier | 74/424.7 |
| 4,871,395 A | 10/1989 | Sugama | 106/678 |
| 4,923,517 A | 5/1990 | Rerup et al. | 524/3 |
| 4,960,649 A | 10/1990 | Takata et al. | 428/574 |
| 4,968,561 A | 11/1990 | Mizobe et al. | 428/397 |
| 4,975,396 A | 12/1990 | Thiery | 501/99 |
| 5,064,785 A | 11/1991 | Kawamoto et al. | 501/72 |
| 5,118,225 A | 6/1992 | Koch et al. | 106/144 |
| 5,154,955 A | 10/1992 | Delvaux et al. | 428/34.5 |
| 5,167,710 A | 12/1992 | Leroux et al. | 106/711 |
| 5,225,243 A * | 7/1993 | Bruck et al. | 427/226 |
| 5,298,071 A | 3/1994 | Vondran | 106/757 |
| 5,339,902 A | 8/1994 | Harris et al. | 166/293 |
| 5,358,676 A | 10/1994 | Jennings et al. | 264/71 |
| 5,421,409 A | 6/1995 | Mueller et al. | 166/292 |
| 5,443,918 A | 8/1995 | Banthia et al. | 428/603 |
| 5,447,564 A | 9/1995 | Xie et al. | 106/644 |
| 5,456,752 A | 10/1995 | Hogan | 106/802 |
| 5,489,626 A | 2/1996 | Takaki et al. | 523/103 |
| 5,588,489 A | 12/1996 | Chatterji et al. | 166/293 |
| 5,628,822 A | 5/1997 | Hogan | 106/802 |
| 5,641,815 A | 6/1997 | Fehlmann | 521/154 |
| 5,648,568 A | 7/1997 | Oharu et al. | 570/176 |
| 5,649,568 A | 7/1997 | Allen et al. | 138/137 |
| 5,690,729 A | 11/1997 | Jones | 106/682 |
| 5,711,801 A | 1/1998 | Chatterji et al. | 106/789 |
| 5,820,670 A | 10/1998 | Chatterji et al. | 106/737 |
| 5,865,000 A | 2/1999 | Nemegeer et al. | 52/309.1 |
| 5,875,845 A | 3/1999 | Chatterji et al. | 166/293 |
| 5,897,699 A | 4/1999 | Chatterji et al. | 106/678 |
| 5,900,053 A | 5/1999 | Brothers et al. | 106/678 |
| 5,916,361 A | 6/1999 | Molloy et al. | 106/696 |
| 5,948,157 A | 9/1999 | McKenney et al. | 106/711 |
| 5,981,630 A | 11/1999 | Banthia et al. | 524/8 |
| 6,016,879 A | 1/2000 | Burts | 175/72 |
| 6,060,535 A | 5/2000 | Villar et al. | 166/293 |
| 6,063,738 A | 5/2000 | Chatterji et al. | 507/269 |
| 6,080,234 A | 6/2000 | Clavaud et al. | 106/644 |
| 6,143,069 A | 11/2000 | Brothers et al. | 106/678 |
| 6,152,227 A | 11/2000 | Lawson et al. | 166/293 |
| 6,156,808 A | 12/2000 | Chatterji et al. | 516/116 |
| 6,220,354 B1 | 4/2001 | Chatterji et al. | 166/293 |
| 6,230,804 B1 * | 5/2001 | Mueller et al. | 166/293 |
| 6,297,202 B1 | 10/2001 | Chatterji et al. | 507/261 |
| 6,308,777 B2 | 10/2001 | Chatterji et al. | 166/293 |
| 6,332,921 B1 | 12/2001 | Brothers et al. | 166/293 |
| 6,367,550 B1 | 4/2002 | Chatterji et al. | 166/293 |
| 6,457,524 B1 | 10/2002 | Roddy | 166/293 |
| 6,458,198 B1 | 10/2002 | Baret et al. | 106/644 |
| 6,488,763 B2 | 12/2002 | Brothers et al. | 106/692 |
| 6,500,252 B1 | 12/2002 | Chatterji et al. | 106/644 |
| 6,508,305 B1 | 1/2003 | Brannon et al. | 166/293 |
| 6,547,871 B2 | 4/2003 | Chatterji et al. | 106/672 |
| 6,550,362 B1 | 4/2003 | Galinat et al. | 83/23 |
| 6,582,511 B1 | 6/2003 | Velpari | 106/711 |
| 6,613,424 B1 | 9/2003 | Putt et al. | 428/312.4 |
| 6,645,288 B1 | 11/2003 | Dargaud et al. | 106/696 |
| 6,647,747 B1 | 11/2003 | Brik | 65/492 |
| 6,689,208 B1 | 2/2004 | Brothers | 106/794 |
| 6,702,044 B2 | 3/2004 | Reddy et al. | 175/64 |
| 6,706,380 B2 | 3/2004 | Edwards et al. | 428/292.1 |
| 6,723,162 B1 | 4/2004 | Cheyrezy et al. | 106/644 |
| 6,729,405 B2 | 5/2004 | DiLullo et al. | 166/292 |
| 6,823,940 B2 | 11/2004 | Reddy et al. | 166/295 |
| 6,824,847 B2 | 11/2004 | Mariaggi et al. | 428/36.9 |
| 6,832,651 B2 | 12/2004 | Ravi et al. | 166/292 |
| 6,861,392 B2 | 3/2005 | Shaarpour | 507/104 |
| 6,866,712 B1 | 3/2005 | Rossi et al. | 106/489 |
| 6,907,929 B2 | 6/2005 | Leroy-Delage et al. | |
| 6,962,201 B2 | 11/2005 | Brothers | 166/293 |
| 7,174,961 B2 | 2/2007 | Chatterji et al. | |
| 7,178,597 B2 * | 2/2007 | Reddy et al. | 166/293 |
| 7,284,611 B2 | 10/2007 | Reddy et al. | 166/295 |
| 2002/0069537 A1 | 6/2002 | Wenzler et al. | 30/189 |
| 2002/0157575 A1 | 10/2002 | DiLullo et al. | |
| 2003/0010314 A1 | 1/2003 | Brossear et al. | 123/306 |
| 2004/0040712 A1 | 3/2004 | Ravi et al. | 166/293 |
| 2004/0045713 A1 | 3/2004 | Bianchi et al. | 166/293 |
| 2004/0069537 A1 | 4/2004 | Reddy et al. | 175/72 |
| 2004/0069538 A1 | 4/2004 | Reddy et al. | 175/72 |
| 2004/0106704 A1 | 6/2004 | Meyer et al. | 524/2 |
| 2004/0108141 A1 | 6/2004 | Reddy et al. | 175/65 |
| 2004/0194960 A1 | 10/2004 | DiLullo et al. | 166/292 |
| 2004/0206501 A1 | 10/2004 | Brothers et al. | 166/292 |
| 2004/0211562 A1 | 10/2004 | Brothers et al. | 166/281 |
| 2006/0000611 A1 | 1/2006 | Reddy et al. | 166/293 |
| 2006/0000612 A1 | 1/2006 | Reddy et al. | 166/293 |
| 2006/0096759 A1 * | 5/2006 | Reddy et al. | 166/295 |
| 2006/0157244 A1 | 7/2006 | Reddy et al. | 166/292 |
| 2006/0174802 A1 | 8/2006 | Bedel et al. | |
| 2006/0213664 A1 | 9/2006 | Chatterji et al. | 166/292 |
| 2007/0051516 A1 | 3/2007 | Reddy et al. | 166/293 |

FOREIGN PATENT DOCUMENTS

| | | |
|---|---|---|
| GB | 2 392 682 A | 3/2004 |
| JP | 60016853 | 1/1985 |
| JP | 5339040 | 12/1993 |
| WO | WO 00/66878 | 9/2000 |
| WO | WO 02/18291 A1 | 3/2002 |
| WO | WO 03/014040 A1 | 2/2003 |
| WO | WO 03/048526 | 6/2003 |
| WO | WO 2004/022500 A2 | 3/2004 |
| WO | WO 2004/022500 A3 | 3/2004 |
| WO | WO 2004/101704 A1 | 11/2004 |
| WO | WO 2006/003389 | 1/2006 |
| WO | WO 2006/100506 | 9/2006 |
| WO | WO 2006/106301 | 10/2006 |
| WO | WO 2007/054670 | 5/2007 |

OTHER PUBLICATIONS

Office Action from U.S. Appl. No. 11/101,762, Oct. 11, 2007.
Office Action from U.S. Appl. No. 11/595,147, Jan. 7, 2008.
Trabelsi et al., Fiber Content Affects Porosity, Permeability, and Strength of Cement, Oil and Gas Journal, 1999.
Foreign Search Report from a Related Counterpart Application, May 11, 2007.
Foreign communication from a related counterpart application, Sep. 7, 2006.
Foreign communication from a related counterpart application, Jun. 28, 2006.
Foreign communication from a related counterpart application, Dec. 12, 2005.
Office Action from U.S. Appl. No. 11/595,147, Jul. 20, 2007.
Office Action from U.S. Appl. No. 11/595,147, Feb. 2, 2007.
Office Action from U.S. Appl. No. 11/272,951, Aug. 6, 2007.
Office Action from U.S. Appl. No. 11/272,951, Jan. 24, 2007.
Office Action from U.S. Appl. No. 11/101,762, May 24, 2007.
Office Action from U.S. Appl. No. 11/101,762, Jan. 24, 2007.
Office Action from U.S. Appl. No. 11/101,762, Sep. 13, 2006.
Office Action from U.S. Appl. No. 11/101,762, Mar. 28, 2006.
Office Action from U.S. Appl. No. 10/884,756, Feb. 17, 2006.
Halliburton brochure entitled "CFR-3 Cement Friction Reducer Dispersant", Aug. 2004.
Halliburton brochure entitled "D-AIR 3000 and D-AIR 3000L Defoamers", 1999.
Halliburton brochure entitled "Econolite Additive for Cement Slurries", 1998.
Halliburton brochure entitled "FWCA Free-Water Cement Additive", 1999.
Halliburton brochure entitled "Microblock Cement Additive", 1999.
Halliburton brochure entitled "MicroBand Expanding Additive for Cement", 1999.
Halliburton brochure entitled "Poxmix A Cement Additive", 1999.

Halliburton brochure entitled "Spherelite Cement Additive", 1999.

Halliburton brochure entitled "SSA-1 Strength-Stabilizing Agent", 1998.

Halliburton brochure entitled "ThermaLock Cement for Corrosive $CO_2$ Environments", Jun. 1999.

Halliburton brochure entitled "Tuf Additive No. 2 Lost-Circulation Additive", 1999.

Saint-Gobain Cem-Fil* Chopped Strands 70/30 Technical Datat Sheet, Oct. 2000.

Saint-Gobain Cem-Fil* Chopped Strands 60/38 Technical Datat Sheet, Oct. 2000.

Saint-Gobain Cem-Fil* Chopped Strands 62/2 Technical Datat Sheet, Jul. 2000.

Saint-Gobain Cem-Fil* Chopped Strands 62/2 Technical Datat Sheet, Oct. 2000.

Saint-Gobain Anti-Crack High Diserpsion Cem-Fil* AR-Chopped Strands Technical Data Sheet, Jan. 2001.

Saint-Gobain Anti-Crack High Performance Cem-Fil* AR-Chopped Strands Technical Data Sheet, Jan. 2001.

Saint-Gobain Cem-Mesh 120/1 Cem-Fil AR-System Technical Data Sheet, Jan. 2001.

Sudaglass Fiber Technology brochure entitled "Basalt-Based Fiber Technology", Nov. 7, 2005.

Sudaglass Fiber Technology brochure entitled "Cut Fibers That Fill the Bill", Nov. 7, 2005.

Cem-FIL® Fibers Product Details, Jun. 12, 2000.

Novomesh e3 Product Bulletin, Nov. 2001.

Novomesh e3 Blend of Steel and Synthetic Fiber Plastic Shrinkage & Plastic Sttlement Crack Control Hardened Concrete Benefits brochure, 2001.

e3 Inforce Virgin Polypropylene Fibrillated Fibers Plastic Shrinkage & Plastic Settlement Crack Control Concrete Toughness brochure, 2001.

e3 Concrete Reinforcement brochure, 2001.

Stealth e3 Virgin Polpropylene Fibers Plastic Shrinkage & Plastic Settlement Crack Control brochure, 2001.

Nycon SF products and services brochure, Jul. 16, 2004.

Nyconb Products and services brochure, Jul. 16, 2004.

Xorex Steel Fiber brochure, Apr. 2002.

Novotex Steel Fiber Brochure, Apr. 2002.

AR Glass Fibers Products and services brochure, Jul. 16, 2004.

Material Safety Data Sheet for AR continuous filaments glass fibers, Jun. 2007.

"The perspective for the future of an innovative construction material," concrete Technology, Jul. 16, 2004.

Whittaker, B.N. et al., "Rock Fracture Mechanics, Principles, Design and Applications", 1992.

Encyclopedia of Polymer Science and Engineering, vol. 6, pp. 802-839, 1986.

Economides, M.J. et al., "Rock Mechanics in Wellbore Construction" chapter 6, Petroleum Well Construction, 1998.

Office Action dated Apr. 23, 2008 from U.S. Appl. No. 11/101,762.

Fibermesh brochure entitled "Fibermesh Inforce Virgin Polyproplene Fibrillated Fibers Plastic Shrinkage & Plastic Settlement Crack Control Concrete Toughness", 2001.

Notice of Allowance dated Apr. 7, 2008 from U.S. Appl. No. 11/595,147.

* cited by examiner

COMPOSITIONS COMPRISING MELT-PROCESSED INORGANIC FIBERS AND METHODS OF USING SUCH COMPOSITIONS

CROSS-REFERENCE TO RELATED APPLICATIONS

This application is a continuation of U.S. patent application Ser. No. 11/272,951 entitled "Compositions Comprising Melt-Processed Inorganic Fibers and Methods of Using Such Compositions," filed on Nov. 14, 2005, now abandoned which is a continuation-in-part of U.S. patent application Ser. No. 11/101,762, entitled "Cement Compositions Comprising High Aspect Ratio Materials, and Methods of Use in Subterranean Formations," filed on Apr. 8, 2005, which is a continuation-in-part of U.S. patent application Ser. No. 10/884,756 filed on Jul. 2, 2004, now U.S. Pat. No. 7,178,597 the entirety of each of which are herein incorporated by reference, and from which priority is claimed pursuant to 35 U.S.C. § 120.

BACKGROUND

The present invention relates to subterranean well cementing operations, and more particularly, to cement compositions comprising melt-processed inorganic fibers and methods for using such cement compositions.

Hydraulic cement compositions commonly are utilized in subterranean operations, particularly subterranean well completion and remedial operations. For example, hydraulic cement compositions are used in primary cementing operations whereby pipe strings, such as casing and liners, are cemented in well bores. In performing primary cementing operations, usually a hydraulic cement composition is pumped into an annular space between the walls of a well bore and the exterior surface of the pipe string disposed therein. The cement composition sets in the annular space, forming therein an annular sheath of hardened, substantially impermeable cement that supports and positions the pipe string in the well bore and bonds the exterior surface of the pipe string to the walls of the well bore. Hydraulic cement compositions also are used in remedial cementing operations, such as plugging highly permeable zones or fractures in well bores, plugging cracks and holes in pipe strings, and the like.

When the cement compositions contact permeable subterranean formations, fluid (e.g., water) may be lost into the formation. Excessive fluid loss may cause the cement composition to become prematurely dehydrated, thereby potentially causing bridging in the annulus and limiting the time for which said slurry can remain pumpable, and/or reducing bond strength between the set cement composition and a subterranean zone, the walls of pipe and/or the walls of the well bore. Fluid loss control additives (e.g., polymers and copolymers) may be included in a cement composition, inter alia, to reduce fluid loss into the formation. When the permeability of the formation is high, for example, because of unconsolidated or depleted formations, or microfractures, the rate of fluid loss may increase to an extent that some conventional fluid loss control additives (e.g., polymer and copolymers) may not be effective in preventing fluid loss from cement compositions. In an extreme case, fluid loss may increase to the point where the cement composition no longer can be circulated back to the surface—in such case, the cementing operation being conducted may be said to have "lost circulation." To help control fluid loss, and to prevent fluid loss from escalating to "lost circulation," certain types of fluid loss control additives that sometimes are referred to as "lost circulation materials" may be included in cement compositions. Examples of conventional lost circulation materials include peanut shells, mica, cellophane, walnut shells, calcium carbonate, plant fibers, cottonseed hulls, ground rubber, and polymeric materials.

Lost circulation also can occur during drilling of subterranean well bores. For example, fluid may be lost into high-permeability zones (e.g., unconsolidated zones or depleted formations), vugular zones, and fractures (e.g., either pre-existing fractures or fractures created during the subterranean operation). Conventional attempts to prevent lost circulation during subterranean drilling operations have involved, for example, the addition of soluble additives (e.g., polymers) to drilling fluids. However, when circulation losses exceed 1 barrel per hour, these additives may not be as effective as desired.

In many cases when circulation losses have been encountered that exceed 1 barrel per hour, conventional insoluble particulate materials (e.g., fibers) have been added to the drilling fluid. Such conventional insoluble particulate materials may form a filter cake on the walls of the well bore. This filter cake may be less permeable than the well bore walls, and, accordingly the establishment of the filter cake may reduce circulation losses. However, the use of conventional insoluble particulate materials may be problematic. For example, if the conventional particulate materials are not chosen carefully, they may cause pumping problems or plug flow lines. In some circumstances, the conventional particulate materials may be screened out on shale shakers (and thus be prevented from remaining with the circulating fluid as it flows into the well bore). In some cases, the comparatively lighter density of the conventional particulate materials may cause them to tend to remain afloat within the comparatively denser drilling fluid. In other circumstances, the addition of conventional particulate materials may cause the drilling fluid to become excessively thick and viscous.

SUMMARY OF THE INVENTION

The present invention relates to subterranean well cementing operations, and more particularly, to cement compositions comprising melt-processed inorganic fibers and methods for using such cement compositions.

An example of a method of the present invention is a method of cementing in a subterranean formation, comprising: providing a cement composition comprising water, cement, and a plurality of melt-processed inorganic fibers having a mean aspect ratio of greater than about 25, a specific gravity of greater than about 1.2, and a length of less than about 10 millimeters; introducing the cement composition into a subterranean formation; and allowing the cement composition to set therein.

Another example of a method of the present invention is a method comprising: providing a cement composition that comprises cement, water, and a plurality of melt-processed inorganic fibers, the melt-processed inorganic fibers having a mean aspect ratio of greater than about 25, a specific gravity of greater than about 1.2, and a length of less than about 10 millimeters; introducing the cement composition into a well bore that penetrates a subterranean formation, and allowing the melt-processed inorganic fibers to at least partially prevent fluid loss from the cement composition into the subterranean formation.

Another example of a method of the present invention is a method of treating a subterranean formation comprising: providing a drilling mud comprising a plurality of melt-processed inorganic fibers, wherein the melt-processed inorganic fibers have a length of less than about 10 millimeters and comprise at least one melt-processed inorganic fiber selected from the group consisting of: a basalt fiber, a wollastonite fiber, and a ceramic fiber; and circulating the drilling mud in the subterranean formation.

Another example of a method of the present invention is a method of reducing fluid loss in a subterranean drilling operation comprising: providing a drilling mud comprising a plurality of melt-processed inorganic fibers, comprising at least one melt-processed inorganic fiber selected from the group consisting of: a basalt fiber, a wollastonite fiber, and a ceramic fiber; and using the melt-processed inorganic fibers to at least partially reduce fluid loss in the subterranean drilling operation.

Another example of a method of the present invention is a method of treating a subterranean formation comprising: providing a drilling mud comprising a plurality of melt-processed inorganic fibers, wherein the melt-processed inorganic fibers have a mean aspect ratio of grater than about 25, a length of less than about 10 millimeters, and comprise at least one melt-processed inorganic fiber selected from the group consisting of: a basalt fiber, a wollastonite fiber, and a ceramic fiber; and circulating the drilling mud in the subterranean formation.

An example of a composition of the present invention comprises: water; cement; and a plurality of melt-processed inorganic fibers having a mean aspect ratio of greater than about 25, a specific gravity of greater than about 1.2, and a length of less than about 10 millimeters.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention

DETAILED DESCRIPTION OF EMBODIMENTS

The present invention relates to subterranean well cementing operations, and more particularly, to cement compositions comprising melt-processed inorganic fibers and methods for using such cement compositions.

Certain embodiments of the cement compositions of the present invention comprise a hydraulic cement, water, and a plurality of melt-processed inorganic fibers having a mean aspect ratio of greater than about 25, a specific gravity of greater than about 1.2, and a length of less than about 10 millimeters. As referred to herein, the term "aspect ratio" will be understood to mean the ratio of a solid body's length to its width. As referred to herein, the term "melt-processed inorganic fibers" will be understood to mean fibers produced from inorganic materials using any suitable melt processing technique, such as melt blowing or melt spinning.

Any hydraulic cement suitable for use in subterranean cementing operations may be used in accordance with the present invention. A variety of hydraulic cements are suitable for use, including those comprising calcium, aluminum, silicon, oxygen, and/or sulfur, which set and harden by reaction with water. Such hydraulic cements include, but are not limited to, Portland cements, pozzolanic cements, gypsum cements, soil cements, calcium phosphate cements, high alumina content cements, silica cements, high alkalinity cements, and mixtures thereof. In certain embodiments, the cement compositions of the present invention may comprise a Portland cement. In certain embodiments, the Portland cement may be chosen from those classified as Class A, C, G, and H cements according to *API Specification for Materials and Testing for Well Cements*, API Specification 10, Fifth Ed., Jul. 1, 1990. Another cement that may be useful in certain embodiments of the present invention is commercially available under the trade name "THERMALOCK™" from Halliburton Energy Services, Inc., of Duncan, Okla. Other cements that may be suitable for use in accordance with the present invention include, inter alia, low-density cements. Such low-density cements may be, inter alia, foamed cements or cements comprising another means to reduce their density, such as hollow microspheres, low-density elastic beads, fly ashes, blast furnace slag, or other density-reducing additives known in the art.

Generally, the water utilized in the cement compositions of the present invention may be fresh water, salt water (e.g., water containing one or more salts dissolved therein), brine (e.g., saturated salt water), seawater, or any combination thereof. This water may be from any source, provided that the water does not contain an excess of compounds (e.g., dissolved organics) that may adversely affect other components in the cement composition. In some embodiments, the water may be present in the cement compositions of the present invention in an amount sufficient to form a pumpable slurry. In certain embodiments, the water is present in the cement compositions of the present invention in an amount in the range of from about 30% to about 180% by weight of cement ("bwoc") therein. In certain embodiments, the water is present in the cement compositions of the present invention in an amount in the range of from about 40% to about 50% bwoc therein. One of ordinary skill in the art, with the benefit of this disclosure, will recognize the appropriate amount of water for a chosen application.

The cement compositions of the present invention comprise melt-processed inorganic fibers. Among other things, inclusion of melt-processed inorganic fibers in the cement compositions of the present invention may aid in the prevention of lost circulation and/or enhance the compressive and tensile strengths of the set cement composition. Inclusion of melt-processed inorganic fibers in the cement compositions of the present invention may be particularly appropriate when fluid loss of about 1 barrel per hour, or more, is encountered.

Melt processing is a well-known procedure for the production of fibers. Suitable melt processing techniques are described in Encyclopedia of Polymer Science and Engineering: Fiber Manufacture, J. E. Mcintyre and M. J. Denton (J. I. Kroschwitz ed., John Wiley and Sons 2d ed.). Suitable examples of melt-processed fibers include melt-blown fibers and melt-spun fibers. In some embodiments, combinations of melt-blown and melt-spun fibers may be used. The melt spinning of fibers may include spinning the material into a continuous strand of single or multiple filaments and then cutting it into a desired length.

The melt-processed inorganic fibers suitable for use in the methods and compositions of the present invention generally have a mean length of less than about 10 millimeters. In certain embodiments, the melt-processed inorganic fibers may have a mean length in the range of from about 0.1 millimeters to about 10 millimeters. In certain embodiments, the melt-processed inorganic fibers may have a mean length of about 0.5 millimeters, or about 1 millimeter, or about 2 millimeters, or about 3 millimeters, or about 4 millimeters, or about 5 millimeters, or about 6 millimeters, or about 7 millimeters, or about 8 millimeters, or about 9 millimeters, or about 10 millimeters. The melt-processed inorganic fibers suitable for use in the methods and compositions of the present invention generally have a mean aspect ratio of greater than about 25. In certain embodiments, the melt-processed inorganic fibers suitable for use in the methods and compositions of the present invention may have a mean aspect ratio of greater than about 100. In certain embodiments, the melt-processed inorganic fibers may have a mean aspect ratio in the range of from about 130 to about 660. In certain embodiments, the melt-processed inorganic fibers may have a mean aspect ratio in the range of from about 130 to about 330. In certain embodiments, the melt-processed inorganic fibers may have a mean aspect ratio in the range of from about 260 to about 660. The melt-processed inorganic fibers may be cut to any desired length, e.g., by mechanically cutting the fiber strands, so as to produce strands having a desired length. As will be appreciated by one of ordinary skill in the art, with the benefit of this disclosure, the length and diameter of the melt-processed inorganic fibers may be adjusted to enhance properties such as their flexibility and ease of dispersion in the cement compositions of the present invention.

The melt-processed inorganic fibers should be present in the cement compositions of the present invention in an amount sufficient to provide the desired mechanical properties and/or fluid loss control. In some embodiments, the melt-processed inorganic fibers may be present in the cement compositions of the present invention in an amount in the range of from about 0.1% to about 20% bwoc. In some embodiments, the melt-processed inorganic fibers may be present in an amount in the range of from about 0.1% to about 10% bwoc. In some embodiments, the melt-processed inorganic fibers may be present in the cement compositions of the present invention in an amount in the range of from about 0.1% to about 3% bwoc.

Suitable melt-processed inorganic fibers may be produced from a variety of materials. Examples of suitable inorganic fibers that may be melt-processed to form suitable melt-processed inorganic fibers include basalt fibers, wollastonite fibers, non-amorphous metallic fibers, ceramic fibers, glass fibers (e.g., AR glass fibers and non-AR glass fibers), and combinations thereof. Basalt fibers generally are produced from basalt, which is an igneous rock that is generally comprised of microscopic grains, such as calcium-sodium (plagioclase) feldspar, pyroxene, and olivine. Suitable melt-processed basalt fibers are commercially available from Sudaglass Fiber Technology, Houston, Tex. Suitable melt-processed ceramic fibers may be processed from alumina-silica material. An example of suitable commercially available melt-processed ceramic fibers is "FIBERFRAX" ceramic fiber, available from Unifrax Corporation, Niagara Falls, N.Y.

As noted above, in certain embodiments of the present invention, the melt-processed inorganic fibers may comprise nonamorphous metallic fibers that have been melt-processed. In certain embodiments, the non-amorphous metallic fibers may be obtained by cold drawing low-carbon steel wires (e.g., steel wool). Suitable metallic fibers include, but are not limited to, chopped steel fibers, stainless steel fibers, brass fibers, bronze fibers, nickel fibers, and titanium fibers. In certain embodiments of the present invention, the non-amorphous metallic fibers are low-carbon chopped steel wool fibers. Examples of suitable metallic fibers include, inter alia, those that are commercially available from Global Material Technologies, of Palatine, Ill., under the trade names "GMT-2136," "GMT-180," and "GMT-380." In certain embodiments wherein steel fibers are used, the steel fibers may comprise carbon present in an amount in the range of from about 0.06% to about 0.11% by weight. In certain embodiments of the present invention wherein the high aspect ratio material comprises non-amorphous metallic fibers, the non-amorphous metallic fibers generally have a mean diameter in the range of from about 0.025 millimeters to about 0.10 millimeters, and a mean length in the range of from about 0.1 millimeter to about 10 millimeters. As will be appreciated by one of ordinary skill in the art, with the benefit of this disclosure, the length and diameter of the non-amorphous metallic fibers may be adjusted to enhance properties such as their flexibility and ease of dispersion in the cement compositions of the present invention. In certain embodiments of the present invention wherein non-amorphous metallic fibers are included, the non-amorphous metallic fibers generally have an aspect ratio in the range of from about 1.25 to about 400. In certain embodiments, the non-amorphous metallic fibers may have an aspect ratio in the range of from about 15 to about 200, and in certain other embodiments, from about 25 to about 100. In certain embodiments of the present invention where non-amorphous metallic fibers are included, the metallic fibers may be present in the cement compositions of the present invention in an amount in the range of from about 0.5% to about 10% bwoc. Due to their density, certain metallic fibers may exhibit a propensity to settle out of the cement compositions of the present invention. Therefore, certain embodiments of the cement compositions of the present invention that comprise melt-processed non-amorphous metallic fibers also may comprise a settling-prevention additive, such as a viscosifier, that may eliminate, or at least reduce, settling. Suitable settling-prevention additives include, inter alia, hydroxyethylcellulose, and xanthan gum. A suitable settling-prevention additive is commercially available from Halliburton Energy Services, Inc., under the trade name "FWCA." Where settling-prevention additives are included in the cement composition, they should be present in the cement composition in an amount that facilitates a uniform density throughout the cement composition. In certain embodiments, non-amorphous metallic fibers may be coated by, e.g., surfactants that may inhibit any reaction that may occur between the cement composition and the metallic fibers. Examples of suitable surfactants that may be used to coat the non-amorphous metallic fibers include, inter alia, hydrophobic organic materials such as sorbitol mono-oleate, sorbitol tri-oleate, and the like. Sorbitol mono-oleate is commercially available from Aldrich Chemical Company, of Milwaukee, Wis., under the trade name "SPAN 80," while sorbitol tri-oleate is commercially available from Aldrich Chemical Company under the trade name "SPAN 85." In certain embodiments of the present invention wherein the non-amorphous metallic fibers are coated, the coating may be present on the non-amorphous metallic fibers in an amount in the range of from about 0.5% to about 5% by weight of the fibers.

As noted above, in certain embodiments of the present invention, the melt-processed inorganic fibers may comprise glass fibers. In certain embodiments, the glass fibers are alkali-resistant (AR) glass fibers, although non-AR glass fibers also may be used in certain embodiments of the present invention. Examples of suitable non-AR glass fibers include general purpose E-glass fibers and specialty glass fibers, such as ECR glass fibers (high corrosion resistance), A-glass fibers, and C-glass fibers. These grades refer to ASTM Specification D 578-98. In certain embodiments of the present invention where non-AR glass fibers are used, the non-AR glass fibers may be made alkali-resistant through the application of a coating with an acrylic acid-based polymer, as will be understood by one of ordinary skill in the art, with the benefit of this disclosure. In certain embodiments wherein the cement compositions of the present invention comprise an alkaline cement, and the melt-processed inorganic fibers comprise glass fibers, AR glass fibers may be particularly suitable. However, when prepared using larger portions of pozzolanic or latent-hydraulic cement additives (e.g., coal, fly ash, or silica dust), or high aluminate cements, certain embodiments of the cement compositions of the present invention may have lower pH values, which may facilitate the use of non-AR glass fibers. One of ordinary skill in the art, with the benefit of this disclosure, will recognize the amounts and mixtures of AR and non-AR resistant glass fibers to use depending on the alkalinity of the cement being used. In certain embodiments, the AR glass fibers may comprise zirconium oxide in an amount in the range of from about 0.01% to about 15% by weight; in certain other embodiments, the AR glass fibers may comprise zirconium oxide in an amount in the range of from about 10% to about 15% by weight. In certain embodiments of the present invention, the glass fibers have a length in the range of from 0.5 to about 10 millimeters, and a diameter in the range of from about 10 to about 400 microns. In certain embodiments, the glass fibers may have an aspect ratio in the range of from about 1.25 to about 5,000. In certain embodiments, the glass fibers may have an aspect ratio in the range of from about 10 to about 1,000, and in certain other embodiments, from about 20 to about 500. Examples of suitable glass fibers include, inter alia, "CEM-FIL® HD" chopped strands and "CEM-FIL® HP" chopped strands, available from Saint-Gobain Vetrotex America, Inc., of Valley Forge, Pa. Other examples of suitable glass fibers include, inter alia, "E" grade "FIBERGLAST," available from Fiberglast Development Corp., of Brookville, Ohio. When included in the cement compositions of the present invention, the glass fibers may be present in an amount in the range of from about 0.1% to about 20% bwoc.

Optionally, the non-amorphous metallic fibers and the glass fibers described above may be added to the cement composition without having been melt-processed, as an additional component to the melt-processed inorganic fibers.

Optionally, certain embodiments of the cement compositions of the present invention also may include solid materials that may strengthen and reinforce the cement. These solid materials may include both natural and man-made materials, and may have any shape, including, but not limited to, beaded, cubic, bar-shaped, flake, fiber, platelets, cylindrical, or mixtures thereof. Suitable such solid materials include, but are not limited to, carbon fibers, plastic fibers (e.g., polypropylene and polyacrylic nitrile fibers), and combinations thereof. Where included, these additional solid materials may be added to the cement composition of the present invention individually or in combination. Additionally, the solid materials of the present invention may be present in the cement composition in a variety of lengths and aspect ratios. One of ordinary skill in the art, with the benefit of this disclosure, will recognize the mixtures of type, length, and aspect ratio to use to achieve the desired properties of a cement composition for a particular application.

Optionally, additional additives may be added to the cement compositions of the present invention as deemed appropriate by one skilled in the art with the benefit of this disclosure. Examples of such additives include, inter alia, fly ash, silica compounds, fluid loss control additives, lost circulation materials, a surfactant, a dispersant, an accelerator, a retarder, a salt, a formation conditioning agent, fumed silica, bentonite, microspheres, expanding additives, weighting materials, organic fibers, and the like. For example, the cement compositions of the present invention may be foamed cement compositions comprising an expanding additive that produces gas within the cement composition in order, inter alia, to reduce the cement composition's density. An example of a suitable expanding additive comprises a blend containing gypsum, and is commercially available under the trade name "MICROBOND" from Halliburton Energy Services, Inc., at various locations. One of ordinary skill in the art with the benefit of this disclosure will recognize the proper amount of an expanding additive to use in order to provide a foamed cement composition having a desired density. An example of a suitable sodium silicate is commercially available from Halliburton Energy Services, Inc., under the trade name ECONOLITE®. An example of a suitable additive that demonstrates free-water-reduction and solids-suspension properties is commercially available from Halliburton Energy Services, Inc., of Duncan, Okla., under the trade name "FWCA™." An example of a suitable dispersant is commercially available from Halliburton Energy Services, Inc., under the trade name "CFR-3." An example of a suitable fly ash is an ASTM class F fly ash that is commercially available from Halliburton Energy Services, Inc., under the trade name "POZMIX® A." An example of a suitable silica flour is commercially available from Halliburton Energy Services, Inc., under the trade name "SSA-1." An example of a suitable fumed silica is an aqueous suspension of fumed silica that is commercially available from Halliburton Energy Services, Inc., under the trade name "MICROBLOCK." An example of a suitable foaming surfactant is commercially available from Halliburton Energy Services, Inc., under the trade name "ZONESEAL 3000." An example of a suitable defoamer is commercially available from Halliburton Energy Services, Inc., under the trade name "D-AIR 3000L."

The melt-processed inorganic fibers may be added to the cement composition at any suitable time, such as before, after, or simultaneously with combining the water and the cement.

To facilitate a better understanding of the present invention, the following examples of certain aspects of some embodiments are given. In no way should the following examples be read to limit, or define, the scope of the invention.

EXAMPLE 1

Sample compositions were prepared by mixing a base fluid with various amounts and grades of fibers. The base fluid comprised an aqueous suspension of 1.64% bentonite clay by weight. For some sample compositions, fibers were mixed into the base fluid. The fibers that were used were either (i) glass fibers, having a mean length of 3 millimeters, commercially available from Saint Gobain Vetrotex, of Madrid, Spain; or (ii) basalt fibers, having a mean length of 6 millimeters, commercially available from Sudaglass Fiber Technology. The AR glass fibers were strand cut to a length of about 3 millimeters with a diameter of about 20 microns, and thus had an aspect ratio of 150. The basalt fibers were strand cut to a length of about 6 millimeters and had a mean aspect ratio in the range of from about 230 to about 660. The sample compositions were charged into a cement fluid loss cell used for measurement of cement slurry losses as described in API Recommended Practice 10B, Twenty-Second Edition, December 1997. The volume of fluid loss for each sample composition was measured as a function of time, and was calculated for 30-minute fluid losses according to the equations provided in the aforementioned API manual.

Sample Composition No. 1 comprised 600 cubic centimeters of water and 10 grams of bentonite clay, with no fibers.

Sample Composition No. 2 comprised the base fluid and AR glass fibers in an amount of about 1.98 pounds per barrel.

Sample Composition No. 3 comprised the base fluid and AR glass fibers in an amount of about 4.95 pounds per barrel. Visual observation of Sample Composition No. 3 indicated that the glass fibers and the bentonite clay formed lumps of a gelatinous mass.

Sample Composition No. 4 comprised the base fluid and basalt fibers in an amount of about 1.98 pounds per barrel.

Sample Composition No. 5 comprised the base fluid and basalt fibers in an amount of about 4.95 pounds per barrel. Visual observation of Sample Composition No. 5 indicated that the basalt fibers and the bentonite clay formed lumps of a gelatinous mass.

The results of the testing are set forth in Table 1, below.

TABLE 1

| Sample Composition | Fiber Type | Fiber Length (mm) | Fiber Amount (lb/bbl) | Initial Spurt (ml) | Total Fluid Collected (ml) | Time (min) | Calculated Fluid Loss (cc/min) |
|---|---|---|---|---|---|---|---|
| Sample Composition No. 1 | None | None | None | 33 | 179 | 17 | 476 |
| Sample Composition No. 2 | AR Glass | 3 | 1.98 | 33 | 58 | 30 | 116 |
| Sample Composition No. 3 | AR Glass | 3 | 4.95 | 60 | 105 | 30 | 206 |
| Sample Composition No. 4 | Basalt | 6 | 1.98 | 44 | 112 | 30 | 224 |
| Sample Composition No. 5 | Basalt | 6 | 4.95 | 120 | 135 | 4.1 | 731 |

Example 1 demonstrates, inter alia, that the lost circulation materials of the present invention reduce lost circulation.

EXAMPLE 2

Figure 1:
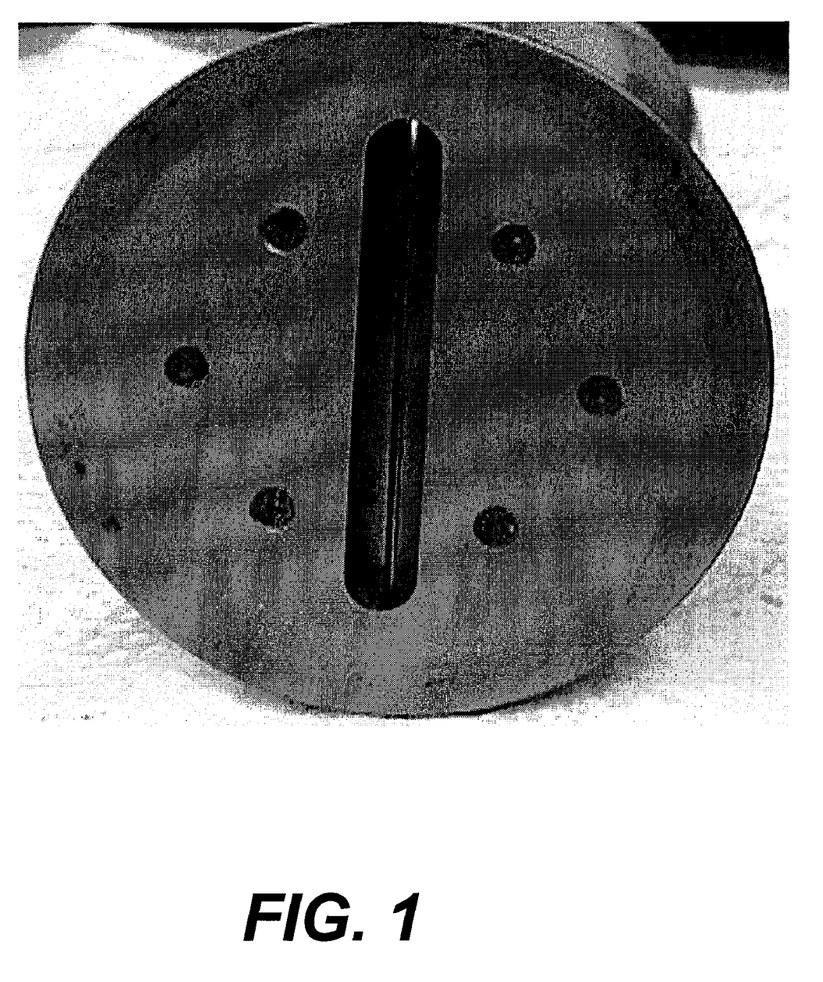
FIG. 1 is a photograph of the test apparatus used in Example 2.
Figure 2:
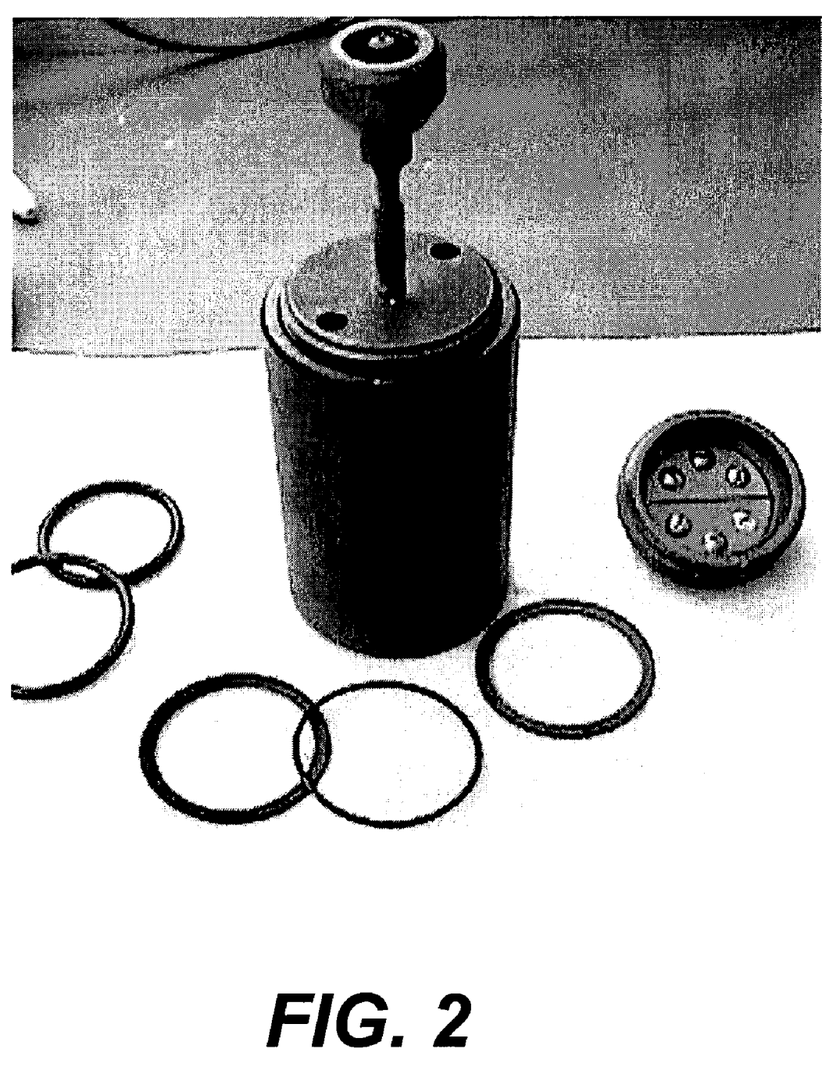
FIG. 2 is another photograph of the test apparatus used in Example 2.

A cement fluid loss cell, illustrated in FIGS. 1 and 2, was equipped on the bottom end with hemispherical plates that were attached (via screws) to a plate having an elliptical opening that was aligned to match with spacing of the hemispherical plates. The hemispherical plates were spaced apart to provide a slit having a predefined width. The bottom plate assembly was secured to the bottom of the pressure chamber with a set of threaded metal rings, and the top of the pressure vessel was equipped with a lid having an attachment for connection with a pressurized gas supply. The slot width was fixed at 0.01 inches, and the slot length was fixed at 1.75 inches. A fluid volume of 200 milliliters of a mud comprising about 6.25% bentonite by weight was used to charge the vessel for each run. After the vessel was charged, air pressure of 100 psi was applied, and the time of the run (e.g., the time until all fluid was lost through the slit) was monitored.

Sample Composition No. 6 comprised the base fluid, with no fibers added.

Sample Composition No. 7 comprised the base fluid, with 2 grams of AR glass fibers that had been strand cut to a length of 3 millimeters.

Sample Composition No. 8 comprised the base fluid, with 5 grams of AR glass fibers that had been strand cut to a length of 3 millimeters.

Sample Composition No. 9 comprised the base fluid, with 10 grams of AR glass fibers that had been strand cut to a length of 3 millimeters.

Sample Composition No. 10 comprised the base fluid, with 2 grams of basalt fibers that had been strand cut to a length of 6 millimeters.

Sample Composition No. 11 comprised the base fluid, with 5 grams of basalt fibers that had been strand cut to a length of 6 millimeters.

Sample Composition No. 12 comprised the base fluid, with 10 grams of basalt fibers that had been strand cut to a length of 6 millimeters.

Sample Composition No. 13 comprised the base fluid, with 2 grams of AR glass fibers that had been strand cut to a length of 6 millimeters.

Sample Composition No. 14 comprised the base fluid, with 5 grams of AR glass fibers that had been strand cut to a length of 6 millimeters.

Sample Composition No. 15 comprised the base fluid, with 10 grams of AR glass fibers that had been strand cut to a length of 6 millimeters.

The results of the testing are set forth in Table 2, below.

TABLE 2

| Sample Composition | Fiber Type | Fiber Length (mm) | Fiber Amount (grams) | Time to Complete Fluid Loss (seconds) |
|---|---|---|---|---|
| Sample Composition No. 6 | None | None | None | 1.64 |
| Sample Composition No. 7 | AR Glass | 3 | 2 | 3.64 |
| Sample Composition No. 8 | AR Glass | 3 | 5 | 6.21 |
| Sample Composition No. 9 | AR Glass | 3 | 10 | 5.00 (plugged) |
| Sample Composition No. 10 | Basalt | 6 | 2 | 1.75 |
| Sample Composition No. 11 | Basalt | 6 | 5 | 3.72 |
| Sample Composition No. 12 | Basalt | 6 | 10 | 5.62 |

TABLE 2-continued

| Sample Composition | Fiber Type | Fiber Length (mm) | Fiber Amount (grams) | Time to Complete Fluid Loss (seconds) |
|---|---|---|---|---|
| Sample Composition No. 12 |  |  |  |  |
| Sample Composition No. 13 | AR Glass | 6 | 2 | 1.55 |
| Sample Composition No. 14 | AR Glass | 6 | 5 | 5.56 |
| Sample Composition No. 15 | AR Glass | 6 | 10 | 11.96 |

Sample Composition No. 9 plugged, and the experiment was halted after 5 minutes had elapsed. About 100 grams of fluid remained in the chamber when the experiment was halted.

Example 2 demonstrates, inter alia, that the improved lost circulation compositions of the present invention desirably reduce the loss of circulation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of treating a subterranean formation comprising:
    providing a drilling mud comprising a plurality of melt-processed inorganic fibers, wherein the melt-processed inorganic fibers have a length of less than 10 millimeters and comprise at least one melt-processed inorganic fiber selected from the group consisting of: a basalt fiber and a ceramic fiber; and
    circulating the drilling mud in the subterranean formation.

2. The method of claim 1 wherein the drilling mud comprises an aqueous fluid and bentonite.

3. The method of claim 1 wherein the melt-processed inorganic fibers have a specific gravity of greater than about 1.2.

4. The method of claim 1 wherein the melt-processed inorganic fibers comprise at least one melt-processed inorganic fiber selected from the group consisting of: a melt-spun fiber and a melt-blown fiber.

5. The method of claim 1 wherein the melt-processed inorganic fibers have a mean aspect ratio of greater than about 25.

6. The method of claim 1 wherein the melt-processed inorganic fibers have a mean aspect ratio in the range of from about 130 to about 660.

7. The method of claim 1 wherein the drilling mud further comprises non-amorphous metallic fibers having a mean aspect ratio of from about 1.25 to about 400.

8. The method of claim 1 wherein the drilling mud further comprises glass fibers having a mean aspect ratio in the range of from about 1.25 to about 5,000.

9. The method of claim 8 wherein the glass fibers have a mean length of from about 0.5 millimeters to about 6 millimeters.

10. A method of reducing fluid loss in a subterranean drilling operation comprising:
    providing a drilling mud comprising a plurality of melt-processed inorganic fibers, the melt-processed inorganic fibers comprising at least one melt-processed inorganic fiber selected from the group consisting of: a basalt fiber, a wollastonite fiber, and a ceramic fiber; and
    using the melt-processed inorganic fibers to at least partially reduce fluid loss in the subterranean drilling operation.

11. The method of claim 10 wherein the melt-processed inorganic fibers have a mean aspect ratio of greater than about 25, a specific gravity of greater than about 1.2, and a length of less than about 10 millimeters.

12. The method of claim 10 wherein the drilling mud comprises an aqueous fluid and bentonite.

13. The method of claim 10 wherein the melt-processed inorganic fibers comprise at least one melt-processed inorganic fiber selected from the group consisting of: a melt-spun fiber and a melt-blown fiber.

14. The method of claim 10 wherein the melt-processed inorganic fibers have a mean aspect ratio of greater than about 25.

15. The method of claim 10 wherein the melt-processed inorganic fibers have a mean aspect ratio in the range of from about 130 to about 660.

16. The method of claim 10 wherein the drilling mud further comprises non-amorphous metallic fibers having a mean aspect ratio of from about 1.25 to about 400.

17. The method of claim 10 wherein the drilling mud further comprises glass fibers having a mean aspect ratio in the range of from about 1.25 to about 5,000.

18. The method of claim 17 wherein the glass fibers have a mean length of from about 0.5 millimeters to about 6 millimeters.

19. A method of treating a subterranean formation comprising:
    providing a drilling mud comprising a plurality of melt-processed inorganic fibers, wherein the melt-processed inorganic fibers have a mean aspect ratio of greater than about 25, a length of less than about 10 millimeters, and comprise at least one melt-processed inorganic fiber selected from the group consisting of: a basalt fiber and a ceramic fiber; and
    circulating the drilling mud in the subterranean formation.

20. The method of claim 19 wherein the drilling mud comprises an aqueous fluid and bentonite.

* * * * *